May 11, 1948. W. H. ZOLLINGER 2,441,526
AUTOMATIC WATER STRAINER
Filed Aug. 9, 1944 5 Sheets-Sheet 1

Inventor
Walter H. Zollinger
By R. S. C. Dougherty
Attorney

May 11, 1948. W. H. ZOLLINGER 2,441,526
AUTOMATIC WATER STRAINER
Filed Aug. 9, 1944 5 Sheets-Sheet 2
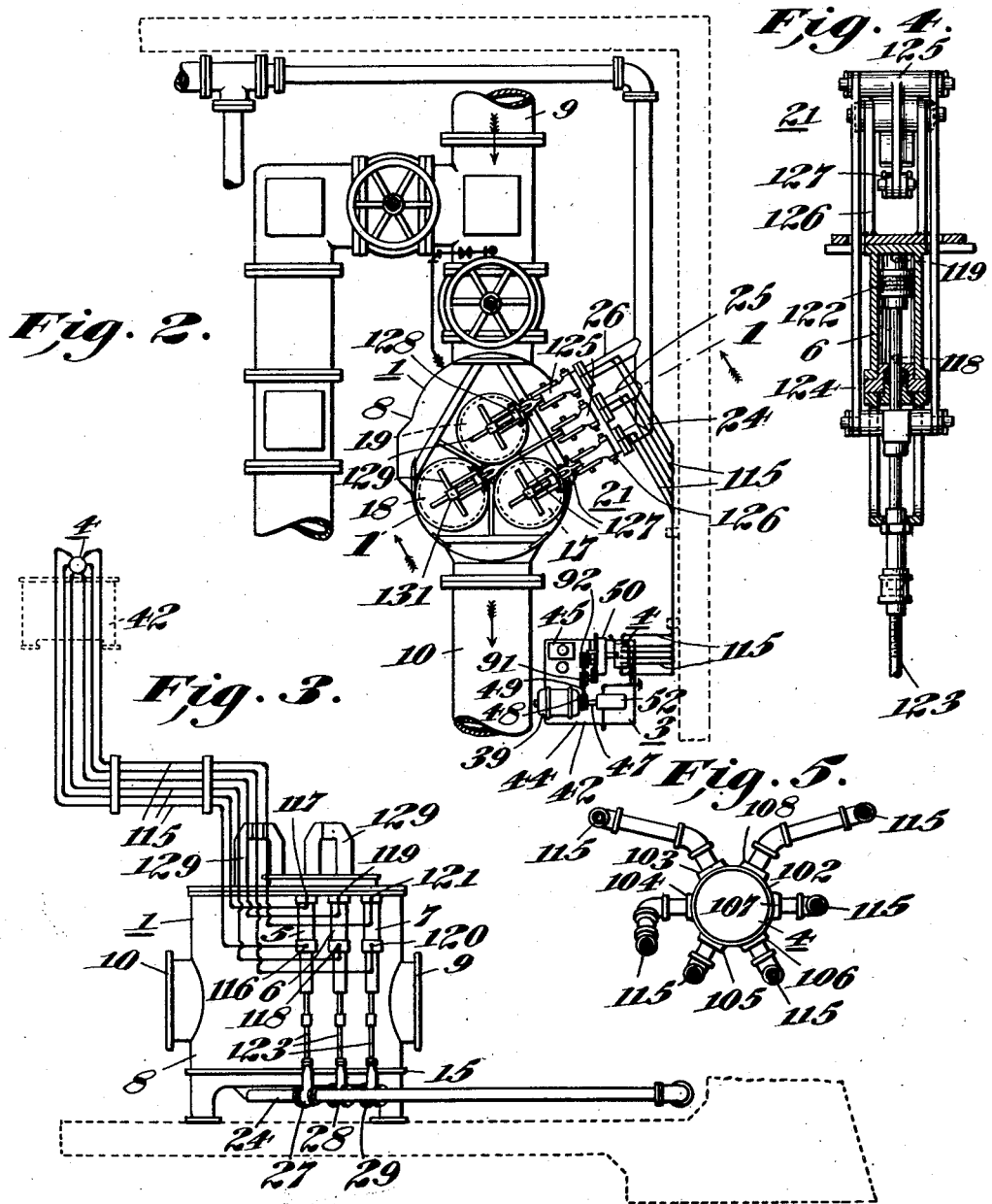

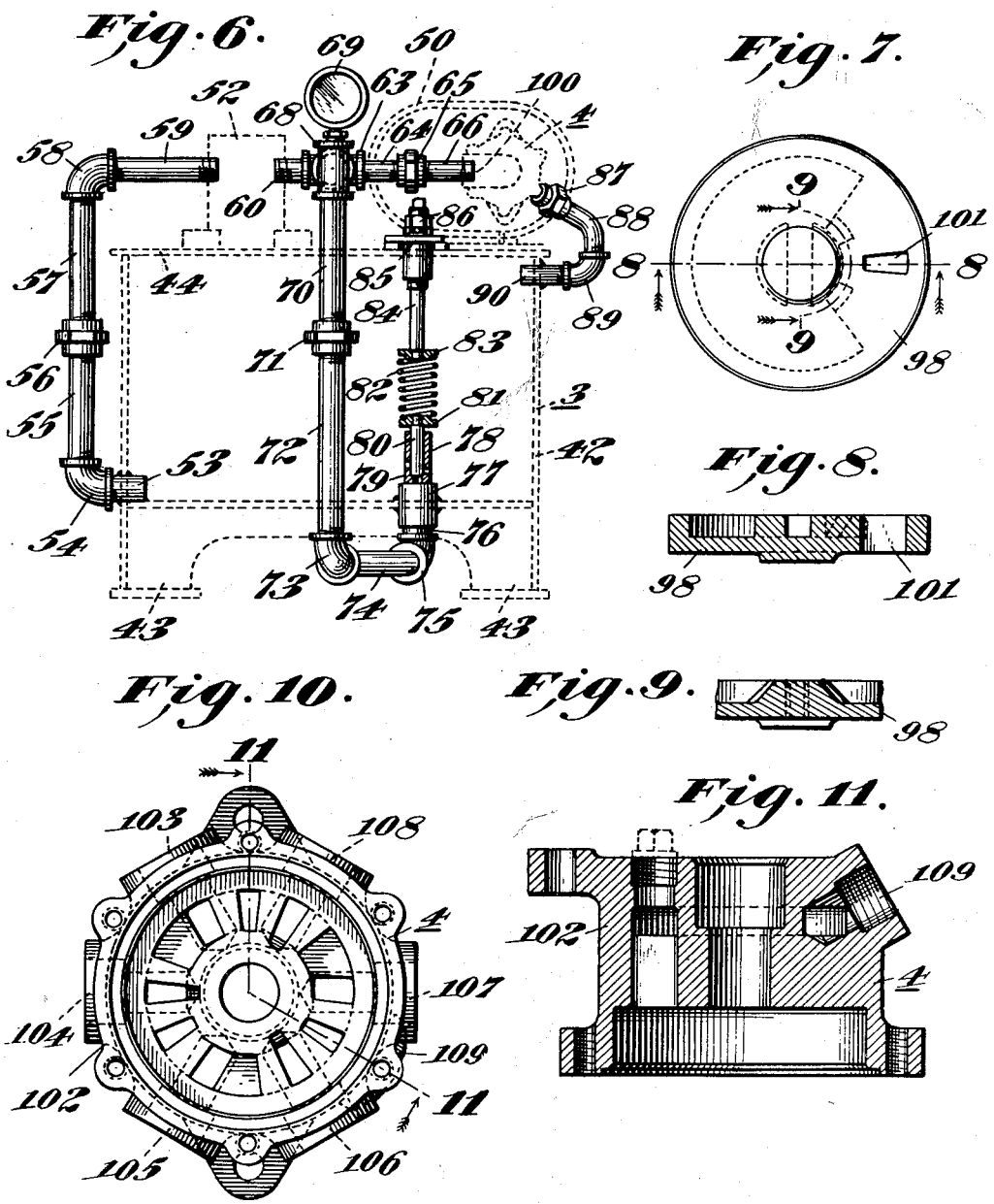

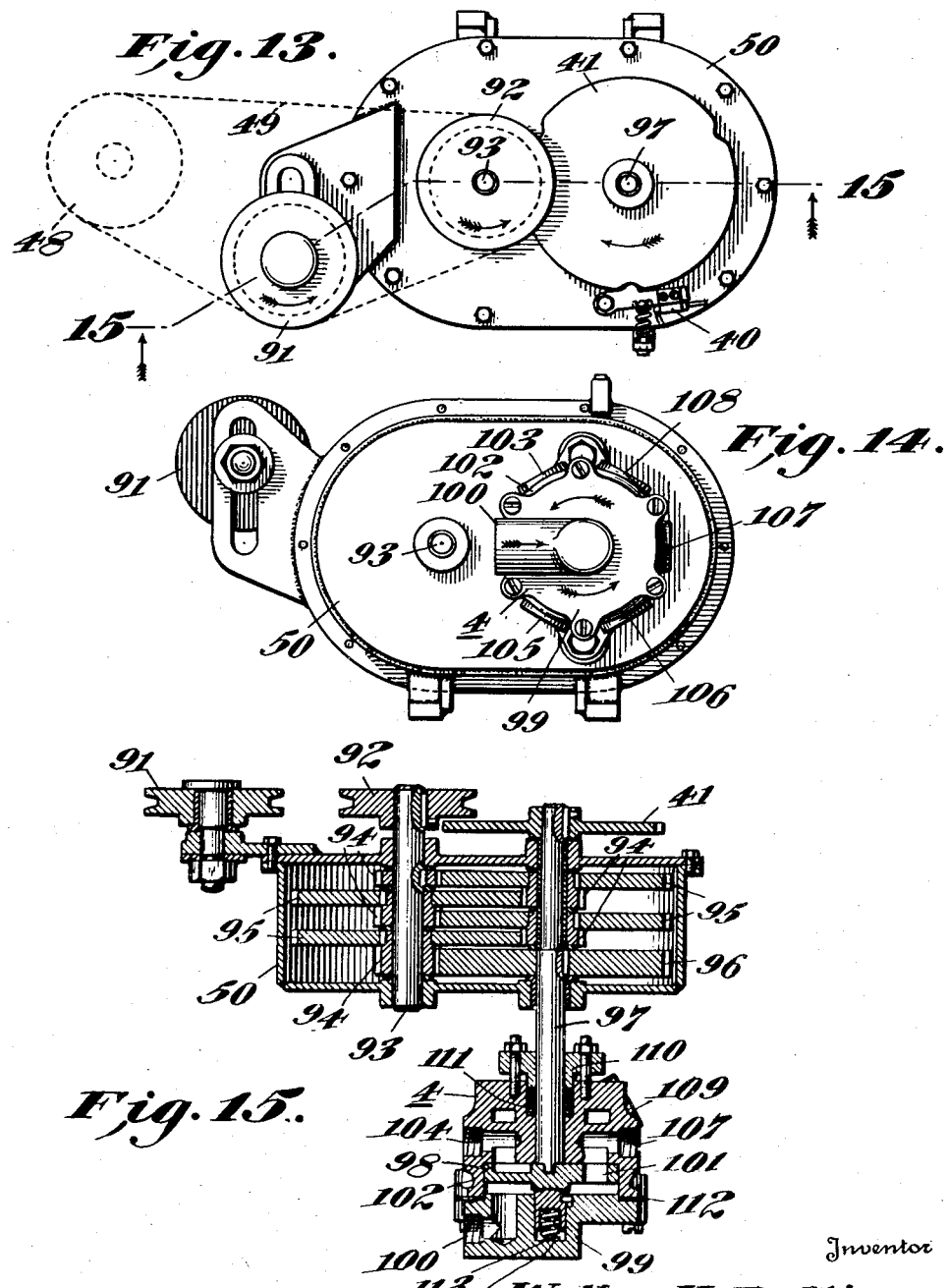

May 11, 1948.  W. H. ZOLLINGER  2,441,526
AUTOMATIC WATER STRAINER
Filed Aug. 9, 1944  5 Sheets-Sheet 5
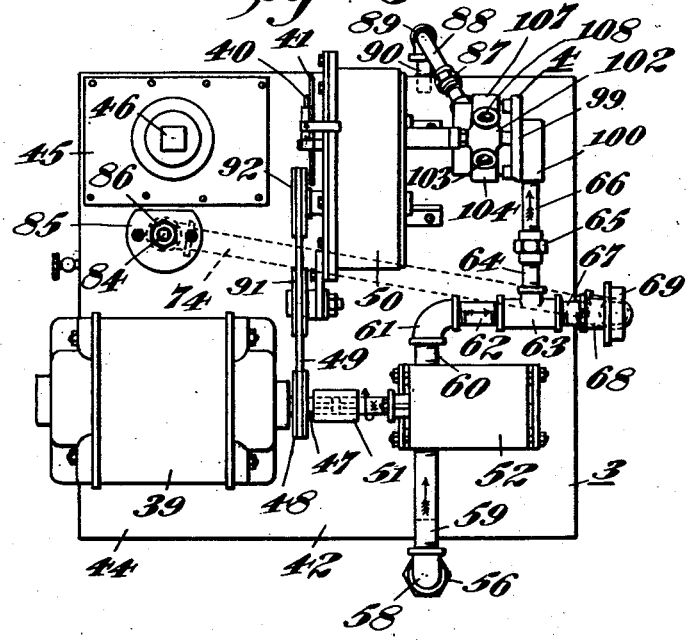
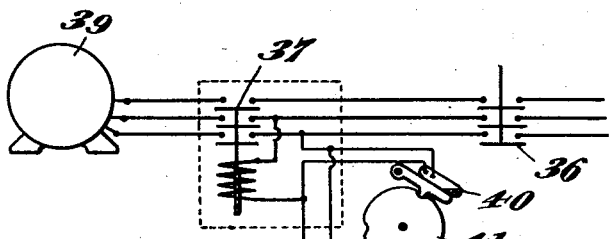
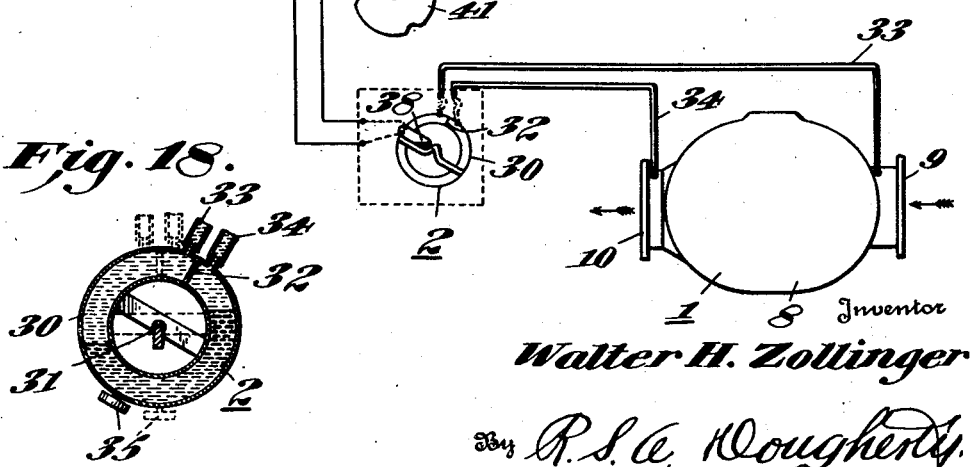
Inventor
Walter H. Zollinger
By R. S. A. Dougherty
Attorney Patented May 11, 1948

2,441,526

UNITED STATES PATENT OFFICE 2,441,526

AUTOMATIC WATER STRAINER

Walter H. Zollinger, Bethlehem, Pa., assignor to Bethlehem Steel Company, a Pennsylvania corporation Application August 9, 1944, Serial No. 548,637

4 Claims. (Cl. 210—152)

REISSUED
MAR 4 1952
RE 23469

My invention relates in general to a new and improved straining apparatus for fluids, and more particularly to an automatic self-cleaning water strainer or filter.

Mechanical water strainers of all types tend to clog easily and require thorough cleansing of their filter surfaces at more or less frequent intervals, depending largely, of course, upon the nature and quantity of the impurities to be separated, but generally several times every hour.

The best mode of accomplishing this is by back-washing with the filtered water, but as usually practiced this has certain disadvantages. Some strainers, for instance, continuously wash small segments of the filter surface in rotation, which is wasteful of water and wearing on the filter. Others back-wash at regularly timed intervals, which may or may not be the times when it is most needed. Virtually all require a number of tight-fitting special valves, such as sleeve valves, which clog easily, are quite expensive, and are now especially difficult to procure in large and off-standard sizes.

One object of my invention, therefore, is a more efficient large-capacity strainer which will automatically clean itself as required without wasting filtered water unnecessarily or interrupting the supply.

Another object is a pressure-responsive control mechanism which will back-wash the filter elements in a definite predetermined sequence.

A further object is a multiple-element strainer which is very simple and economical in construction and operation, and with its major operating parts easily accessible for repairs or changes.

Still other objects and purposes of this invention will appear hereinafter in the specification and in the appended claims.

Having above given a general description of the advantages of my invention, I shall now in order to make the same more clear refer to the annexed five (5) sheets of drawings forming a part of this specification and in which like characters of reference indicate like parts:

Fig. 2 is a top plan view of the strainer with the pumping unit and piping;

Fig. 3 is a side elevation of the strainer showing the connection between the valve-operating cylinders and the pumping unit;

Fig. 4 is a sectional elevation of one of the valve-operating cylinders;

Fig. 5 is a side elevation showing the distributor valve piping;

Fig. 6 is a diagrammatic view of the piping associated with the pumping unit, which unit is indicated in dotted lines;

Fig. 7 is a top plan view of the rotor of the distributor valve;

Fig. 8 is a section taken on line 8—8 of Fig. 7;

Fig. 9 is a fragmentary section taken on the line 9—9 of Fig. 7;

Fig. 10 is a top plan view of the body portion of the distributor valve;

Fig. 11 is an inverted sectional elevation taken on the line 11—11 of Fig. 10;

Fig. 12 is a fragmentary section of one of the ports in the valve body;

Fig. 13 is an inverted side elevation of the gear reduction unit showing the cam and limit switch;

Fig. 14 is a side elevation of the reverse side of the gear reduction unit showing the distributor valve;

Fig. 15 is a section taken on the line 15—15 of Fig. 13;

Fig. 16 is a top plan view of the pumping unit;

Fig. 17 is a wiring diagram of the automatic pressure control means; and

Fig. 18 is a vertical section of the differential pressure controller used.

Figure 1:
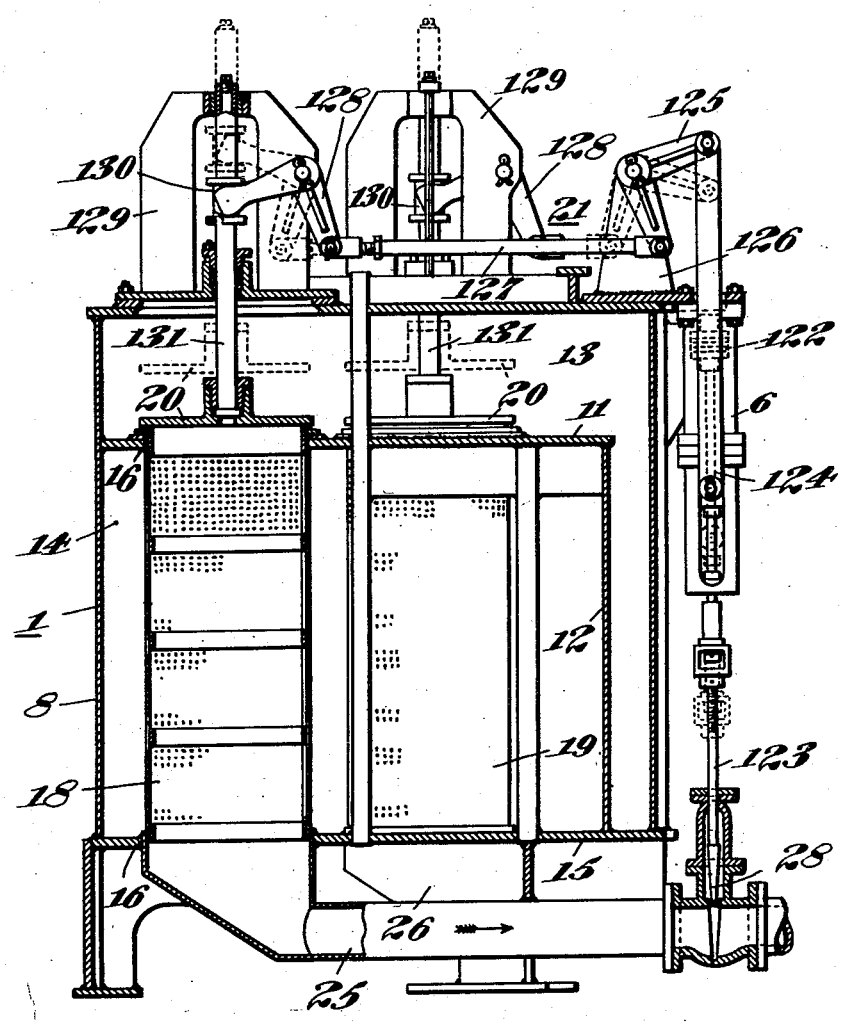
Figure 1 is a sectional elevation of the strainer taken along the line 1—1 of Fig. 2.

As shown in the drawings, my invention comprises broadly, in combination, the strainer 1, the pressure differential controller 2, the pumping unit 3, the distributor valve 4, the back-wash valve actuating cylinders 5, 6 and 7, and their associated wiring and piping systems.

The strainer 1 comprises the substantially ovoid metal shell or casing 8, provided with the raw-water inlet pipe 9 and filtered-water outlet pipe 10 at its respective ends. Welded partition plates 11 and 12 divide the casing 8 into a raw-water chamber 13 and a filtered-water chamber 14. The upper partition plate 11 and the bottom plate 15 are each provided with circular orifices 16 adapted to receive the three open-ended perforated cylindrical filter baskets 17, 18 and 19, which baskets may be constructed as shown in Fig. 1 of zinc-plated steel or the like and are arranged to function normally in parallel to provide a large effective area. At the top of each said basket is located one of the strainer valves 20, which through the linkage means 21 is connected to one of the hydraulic cylinders 5, 6 or 7 for opening and closing said valve 20. These strainer valves 20 do not need to close tightly, as any leakage will not appreciably affect the operation, so the flat metal discs shown will serve as well or better for valve closures than more expensive fittings. The open bottom of each basket is connected by the pipe 24, 25 or 26 to a back-wash gate valve 27, 28 or 29, each of which is in turn connected to its respective hydraulic cylinders 5, 6 or 7 by the linkage 21 in such a manner that when its strainer valve 20 is opened the back-wash valve is closed, and vice versa.

The differential pressure controller 2 is of the ring-balance recorder type shown in Fig. 18, and comprises a hollow ring-body 30 rotatably mounted on the knife edge bearing 31 and partially filled with a sealing fluid such as oil, mercury or the like. Said ring-body 30 is divided by the upper partition 32 into the two compartments shown, one of which connects by flexible tube 33 to the inlet 9 and the other by similar tube 34 to the outlet 10 of the strainer 1. The torque due to differences in pressure is opposed and partially balanced by the counterweight 35, the range of the control depending upon the size of said counterweight, which may be of any desired value.

As shown in the wiring diagram of Fig. 17, a source of three-phase alternating current or other suitable current, provided with a disconnect switch 36, is connected to the magnetic starter 37, which is actuated by the mercury switch 38 on the pressure differential controller 2 to start the motor 39. A mercury limit switch 40 in parallel with said switch 38 is adapted to be operated by the indented disc timer cam 41 as hereinafter described.

The pumping unit 3, as shown in Figs. 6 and 16, comprises the substantially rectangular reservoir or storage tank 42, supported on suitable legs 43 or the like, and containing oil or other hydraulic fluid. Upon the top plate 44 of said tank is bolted screen cover plate 45 and plug 46 for filling the tank 42, and the electric motor 39, whose shaft 47 is connected by the pulley 48 and belt 49 to the gear reducer 50, and by the coupling 51 to the rotary pump 52. The outlet 53 of the tank 42 is connected by the elbow 54, pipe 55, union 56, pipe 57, elbow 58 and pipe 59 to the input side of said pump 52, the output side of said pump connecting by the pipe 60, elbow 61, and pipe 62 to the T 63. One branch of said T 63 connects by the pipe 64, union 65, and pipe 66 to the distributor valve 4, and the other branch of said T 63 connects by the pipe 67 to the T 68. The pressure gauge 69 is mounted on the latter T 68, which connects by the pipe 70, union 71, pipe 72, elbow 73, pipe 74, elbow 75, pipe 76 and coupling 77 to the pressure relief valve 78. The barrel 79 of said relief valve 78 is perforated to relieve excessive pressure, which will push upward the plunger 80 against the spring washer 81 and the spring 82. The force of this spring 82 against the spring washer 83 is adjustable by means of the square-headed threaded rod 84 in the flanged nut 85 and secured to the top plate 44 and locked by the hexagonal nut 86. Oil from the distributor valve 4 is also returnable to the tank 42 through the coupling 87, bent pipe 88, elbow 89, and return pipe 90.

Referring to Figs. 13 to 15, inclusive, the electric motor 39, through its shaft 47, pulley 48 and belt 49, passing over the adjustable belt-tightening pulley 91, is enabled to rotate the pulley 92 on the shaft 93 of the gear reducer 50. With particular reference to Fig. 15, it will be noted that the upper pinion 94 on the shaft 93 is keyed thereto and drives the upper gear 95 on shaft 97, while all the other pinions on shafts 93 and 97 are keyed to the gears 95 with the gear 96 keyed to the shaft 97. The reduction in speed from the shaft 93 to the shaft 97 which is effected by said gear reducer 50 is from approximately 1135 R. P. M. to 0.830 R. P. M., or about 1367½ to 1. Said shaft 97 has its upper end connected to the indented disc cam 41 actuating the mercury limit switch 40 and its lower end connected to the rotor 98 of the distributor valve 4.

Said distributor valve 4, for the three-basket strainer shown, is an eight-way bronze valve comprising a cover portion 99 having an inlet port 100 connecting to the pipe 66, a round rotor portion 98 as in Figs. 7, 8 and 9 having a distributing aperture 101, and a body portion 102 as in Figs. 10, 11 and 15, having the seven outlet ports 103, 104, 105, 106, 107, 108 and 109. Gland 110, packing 111, gasket 112, spring seat 113 and spring 114 permit operation without leakage or loss of pressure.

The outlet ports 103, 104, 105, 106, 107, and 108 connect in sequence through the piping 115 to the lower and upper inlet openings 116, 117, 118, 119, 120 and 121 of the hydraulic cylinders 5, 6 and 7. Coupling 87 connects to the outlet port 109.

The hydraulic cylinders 5, 6 and 7 are identical in construction, as shown in Figs. 1 and 4. The piston 122 in each of said hydraulic cylinders is operatively connected to the valve system as aforesaid by the linkage 21, comprising a rod 123 to back-wash gate valves 27, 28 or 29, and the yoke 124, bell-crank 125 pivoting on support 126, link 127, bell-crank 128 pivoting on support 129 and socket 130 on lift-rod 131 secured to strainer valve 20.

In operation, the back-washing of the baskets 17, 18 and 19 is fully automatic and in a given sequence, as follows: Whenever the pressure differential between the inlet 9 and outlet 10 of the strainer 1 reaches the point which has been found to indicate a detrimental clogging of the baskets, the alteration in the balance of inlet and outlet pressures upon the sealing fluid in the ring-body 30 of the pressure differential controller 2 causes said ring body 30 to swing as in Fig. 18 toward the low pressure or outlet side, or approximately from the position shown in dotted lines to the position shown in full lines, and the attached mercury switch 38 actuates the magnetic starter 37 of the motor 39. This operates the rotary oil pump 52 and at the same time through the gear reducer 50 slowly turns the rotor 98 of the distributor valve 4 to direct the pumped oil to the lower end 116 of the first operating cylinder 5. The oil pressure in the lower end of said cylinder 5 lifts its piston (not shown) and thus actuates its above-described linkage 21 which closes the strainer valve (not shown) and opens the back-wash gate valve 27. Opening said back-wash valve 27 relieves the water pressure in the first basket 17, and some of the strained water which has passed through the other two baskets 18 and 19 passes through the basket 17 to be back-washed, in the reverse direction, thus freeing the trash that has collected on the inside wall of the basket 17 and dumping it through the open bottom thereof. Gravel or other heavy waste will settle at the bottom of the said basket 17 and will be dumped likewise.

The angular spacing between ports 103 and 104 of the distributor valve 4 is so arranged that the first basket 17 will be back-washed for approximately 12 seconds, after which the oil pressure is applied to the upper end 13 of the operating cylinder 5, the said piston is pushed downward, its linkage 21 is actuated in the reverse direction so that the back-wash valve 27 closes and the strainer valve opens, and the first basket 17 returns to normal operation.

If the only substantial amount of clogging had been in the first basket 17, now cleaned, the cam-operated limit switch 46 will stop the pump motor 39 and terminate the back-washing, as the normal pressure differential across the strainer will have been restored by this first back-wash operation. However, if there should also be clogging in the remaining baskets, and thus the pressure differential should still be too high, the pressure differential switch 38 will maintain the contactor of the pump motor starter 37 closed and the distributor valve 4 will proceed as above described to direct the pumped oil in turn through the ports 105 and 106 to inlets 118 and 119 of cylinder 6 respectively, raising and lowering the piston 122 to actuate through its linkage 21 its strainer valve 20 and back-wash gate valve 28 to back-wash the second basket 18; and if necessary, the distributor valve 4 will then direct oil through the ports 107 and 108 to inlets 120 and 121 of cylinder 7, raising and lowering its piston 122 to actuate through its linkage 21 the strainer valve 20 and back-wash gate valve 29 of the third basket 19.

From the foregoing description it will be seen that the strainer is fully automatic, synchronized and economical, the filtered water being used for back-washing only when the baskets actually require it.

Although I have hereinabove shown and described my invention in considerable detail, I do not wish to be limited narrowly to the exact and specific structure and arrangement stated, but I may use such substitutes, modifications or equivalents thereof as are within the scope and spirit of the invention and of the appended claims.

Having thus described my invention, what I claim as new and useful and desire to protect by Letters Patent is:

1. A fluid-straining apparatus comprising an outer casing having inlet and outlet pipes, a pressure chamber within said casing, a plurality of filter baskets therein, each basket having a normally open strainer valve engaging therewith and a drain pipe and normally closed gate valve connected thereto, hydraulic cylinder means operatively linked to said valves for simultaneously closing the strainer valve and opening the gate valve, a line supplying hydraulic fluid thereto, a pump and a distributor valve in the hydraulic fluid supply line, an electric motor operatively connected to said pump and distributor valve, and a ring balance pilot mechanism subject to the difference in pressure between the two sides of said fluid straining apparatus, said pilot mechanism being constructed and arranged to actuate switch means closing an electrical circuit to the motor when the difference in pressure exceeds a predetermined standard.

2. A fluid-straining apparatus comprising a casing having inlet and outlet connections, horizontal and vertical partitions dividing the casing into an inner and an outer chamber, the horizontal partition being provided with a plurality of openings, a cylindrical screen open at both ends and having its upper end supported in each such opening and extending downwardly with its bottom end in contact with the floor in said inner chamber, a strainer valve at the upper end of each cylindrical screen, drainage openings in the bottom of said inner chamber communicating with the bottom end of each screen, a drain pipe connected at each drainage opening, a drain valve on each drain pipe, an external hydraulic cylinder for each screen so linked to its strainer valve and drain valve as to close one valve when the other is opened, a source of fluid pressure, a rotary distributor valve having ports connecting said fluid pressure source with the hydraulic cylinders in regular sequence, an electric motor operatively connected to said distributor valve, an electric current source connected to said motor by a circuit including switch means, and a pressure responsive mechanism connected between the inlet and outlet connections of the strainer and operatively connected to said switch means.

3. A fluid-straining apparatus comprising an outer casing provided with a raw-water inlet and a filtered-water outlet, partition plates dividing the casing into an upper raw-water chamber and a lower filtered-water chamber, a plurality of orifices in said partition plates, a plurality of filter baskets open at each end and inserted vertically through said orifices into the filtered-water chamber, a normally open strainer valve at the upper end of each filter basket, a plurality of drainage openings and a plurality of normally closed back-wash valves each communicating with the bottom end of a filter basket, a plurality of two-way hydraulic cylinders mounted outside the casing, each of said cylinders having a piston operatively linked to the valves of a filter basket, a separate fluid reservoir, a motor mounted thereon, a pressure differential responsive device connected between the inlet and outlet by suitable conduits and provided with means for starting the motor at a predetermined point of pressure increase, a pump coupled to said motor and connected to the reservoir, a distributor valve coupled through speed-reducing means to said motor and connected between the pump and the ends of the hydraulic cylinders, thereby closing the strainer valve and at the same time opening the back-wash valve of a filter basket and then reversing the operation, for each filter basket in sequence.

4. A fluid-straining apparatus comprising a casing having inlet and outlet connections, a plurality of filter baskets therein arranged to operate normally in parallel, a strainer valve located at the top of each basket, a back-wash valve communicating with the bottom of each basket, an external operating cylinder for each basket having a piston connected by linkage to the strainer valve and back-wash valve so that when one of said valves is open the other is closed, a separate reservoir for storing fluid for the operating cylinders, a pump connected to said reservoir for forcing fluid therefrom, a distributor valve connected to said pump for receiving fluid therefrom and directing the fluid through piping successively to each end of each operating cylinder to actuate the valves, reduction gearing operatively connected to said distributor valve, an electric motor operatively connected to the pump and reduction gearing, an electrical supply circuit including a normally open relay switch connected to said motor, a pressure differential responsive device connected across the inlet and outlet connections by suitable conduits and having switch means thereon for closing the relay switch when the pressure differential is increased by clogging, and a cam-operated limit switch operatively coupled to the gear reducer and connected to open the circuit to the motor when the normal pressure differential has been restored.

WALTER H. ZOLLINGER.

REFERENCES CITED

The following references are of record in the file of this patent:

UNITED STATES PATENTS

| Number | Name | Date |
| --- | --- | --- |
| 1,359,162 | Genter | Nov. 16, 1920 |
| 1,883,805 | Martin et al. | Oct. 18, 1932 |
| 2,041,048 | Chesny | May 19, 1936 |
| 2,066,479 | MacIsaac | Jan. 5, 1937 |
| 2,076,322 | Pick | Apr. 6, 1937 |
| 2,240,163 | Pick | Apr. 29, 1941 |
| 2,359,938 | Quiroz | Oct. 10, 1944 |
| 2,366,903 | Harms et al. | Jan. 9, 1945 |